United States Patent [19]
Hansel et al.

[11] Patent Number: 5,502,379
[45] Date of Patent: Mar. 26, 1996

[54] SENSOR FOR MEASURING THE SWING OF A CABLE INCLUDING A CROWN WITH PERMANENT MAGNETS SECURED TO THE CABLE

[75] Inventors: Jozef Hansel; Jerzy Kwasniewski; Andrej Tytko; Leslaw Lankosz, all of Krakow, Poland

[73] Assignee: Reichert Technology S.A., Pagny Sur Moselle, France

[21] Appl. No.: 268,036

[22] Filed: Jun. 29, 1994

[51] Int. Cl.$^6$ .............................. G01B 7/14; G01B 7/30; G01P 13/00
[52] U.S. Cl. .................. 324/207.14; 73/DIG. 3; 324/207.22; 324/207.25; 324/207.26
[58] Field of Search ............. 324/207.14, 207.15, 324/207.16, 207.2, 207.21, 207.22, 207.25, 207.26; 73/DIG. 3; 340/686

[56] References Cited

U.S. PATENT DOCUMENTS 2,536,805  1/1951  Hansen, Jr. .................. 324/207.2 X
3,381,216  4/1968  Sibley, Jr. et al. ............. 324/207.25 X
4,717,873  1/1988  Carr, Jr. et al. ................ 324/207.16
4,924,180  5/1990  Nasr et al. ..................... 324/207.25 X

FOREIGN PATENT DOCUMENTS 0194932   9/1986  European Pat. Off. ........... 324/207.2
93/02191  8/1994  France.

*Primary Examiner*—Gerard R. Strecker
*Attorney, Agent, or Firm*—Weiser & Associates

[57] ABSTRACT

A sensor for measuring the swing of a cable or load includes a crown which creates a stable magnetic field, and a fixed portion for detecting movement of the crown, and the cable or load to which the crown is attached. The crown is secured to the cable and includes a series of permanent magnets disposed radially between an inner magnetic ring and an outer magnetic ring. The fixed portion includes measuring elements secured to a support, and defines a measuring space within which the crown can move.

9 Claims, 1 Drawing Sheet

5,502,379

SENSOR FOR MEASURING THE SWING OF A CABLE INCLUDING A CROWN WITH PERMANENT MAGNETS SECURED TO THE CABLE

BACKGROUND OF THE INVENTION

The present invention concerns a sensor for measuring the swing of a cable.

The sensors currently used to measure swing implement contact techniques comprising one or more sensors or instruments placed directly on the cable or load. This requires that a linking element be placed between the instrument and the display device in front of the user, or between the sensor and the instrument. This linking device is subject to breakdowns and requires maintenance operations. In addition, the sensor is difficult to move and only provides unidirectional measurements.

SUMMARY OF THE INVENTION

It is the primary object of the present invention to provide a more versatile sensor, which is not subject to the foregoing disadvantages.

This and other objects are achieved in accordance with the present invention using stable magnetic field sensors, which could previously only be used on static cables. Stable magnetic field sensors have an air gap which can be traversed by a moving cable. As a result, such sensors are able to provide reliable measurements which can be interpreted without being affected by hysteresis. To employ stable magnetic field sensors in this way, it is necessary to modify their overall design. In accordance with the present invention, this is accomplished by providing a field sensor comprising a crown which can be secured to a cable (to be monitored) including permanent magnets disposed radially between an internal magnetic ring and an outer magnetic ring, and a fixed portion including measuring elements secured to a support which defines a measuring space in which the crown can move. Preferably, four magnets are disposed on two perpendicular measuring axes (X and Y axis) to accomplish this. Magnetic concentrators may be provided on the support to obtain better results with measuring elements such as Hall effect sensors or magnetoresistors.

The invention shall be more readily understood from a reading of the description provided below, with reference to the following drawings.

DETAILED DESCRIPTION OF THE PREFERRED EMBODIMENTS

Figure 1:
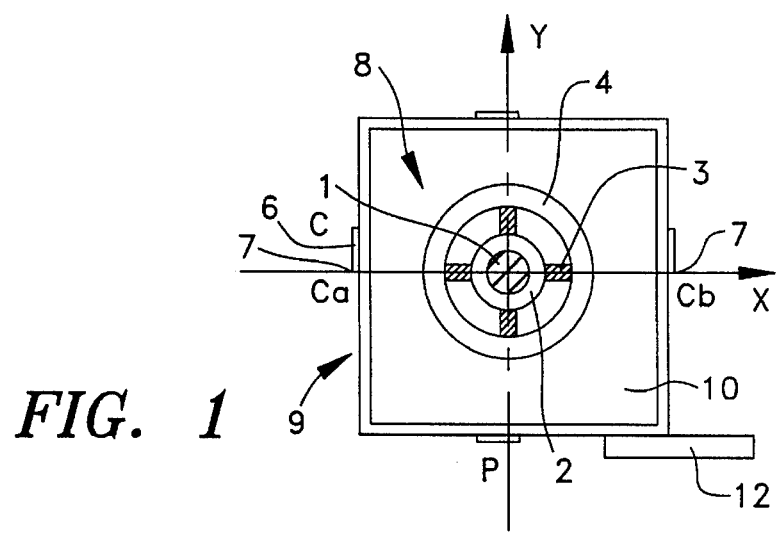
FIG. 1 is a top view of a first alternative embodiment sensor produced in accordance with the present invention.
Figure 2:
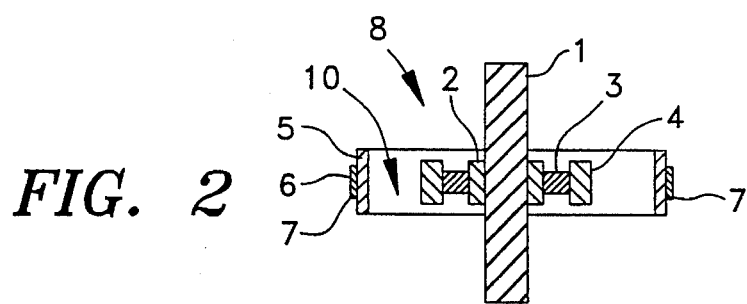
FIG. 2 is a cross-sectional view of the sensor of FIG. 1.

FIGS. 1 and 2 show a first non-restrictive embodiment of this invention. Illustrated is a stable magnetic field sensor (9) which is installed on a cable (1) whose swing is to be monitored and measured. The sensor (9) is generally comprised of a crown (8) and a fixed portion which is spaced from, and which surrounds the crown (8).

In the embodiment of FIGS. 1 and 2, the crown (8) includes four permanent magnets (3) disposed radially between an inner magnetic ring (2) and an outer magnetic ring (4). The inner ring (2) is fixed to the cable (1) and the ring/magnetic unit (2, 3, 4) combines to form a crown (8) which can move with the cable (1).

The fixed portion includes plural measuring elements (6 or 7) secured to a support (5) made of non-ferromagnetic material. For example, the support (5) may be formed as a series of small bars disposed in a square around the crown (8), thus defining a measuring space (10) in which the crown (8) moves. The fixed portion is attached to an available stationary surface, which is schematically represented at 12 in FIG. 1.

Discrete sensors (6) may be used for simple measurements. For example, a sensor (C) may be used which is placed on the YZ plane, and which is responsive to movement in the X direction. A sensor (P) may be used which is placed on the XZ plane, and which is responsive to movement in the Y direction. Differential sensors (7) may also be used, as for example, the sensor pair (Ca-Cb), which are responsive to movement in the X direction. The system of coordinates (XYZ) are taken as a reference where XY represents movement in the plane of the cable and Z represents the measured results. The measuring elements may be Hall effect, magnetoresistive, inductive, or other types of sensors.

Figure 3:
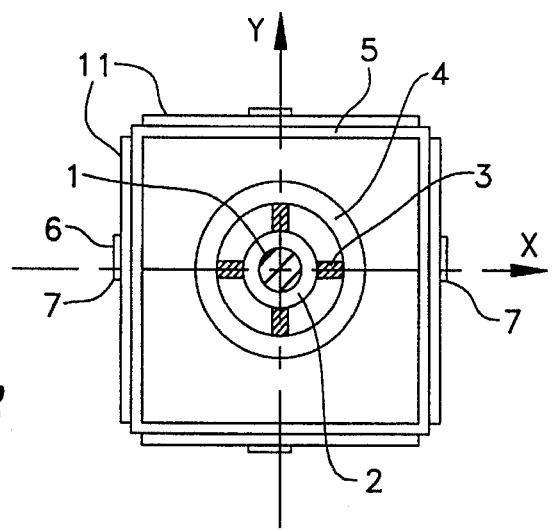
FIG. 3 is a top view of a second alternative embodiment sensor produced in accordance with the present invention.
Figure 4:
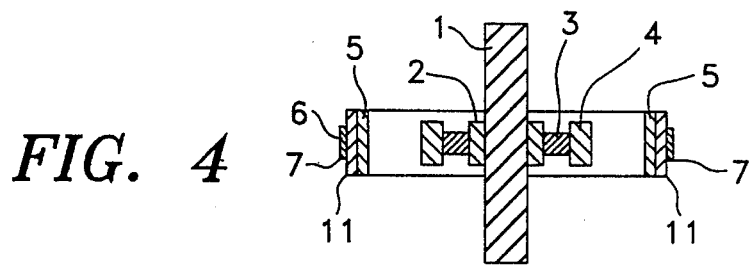
FIG. 4 is a cross-sectional view of the sensor of FIG. 3.

FIGS. 3 and 4 show another embodiment of this invention. The elements of this embodiment are the same as the preceding embodiment, but in addition, include magnetic concentrators (11) placed on the support (5). The concentrators (11) are used with direct measuring elements (6) or differential measuring elements (7) employing Hall effect sensors and are made of low coerciveness materials such as ARMCO ® or PERMALLOY®, to reduce the reciprocal influence of the fields in the X an Y direction.

For measuring elements formed of Hall effect sensors, the variation of magnetic induction may be monitored with conventional Gaussmeters. Variations are produced by movement of the cable (1) and the crown (8). For measuring elements of another type, monitoring devices of a corresponding type should be used. It is also possible to process the signals received by the measuring elements (6, 7) with suitable data processing methods, an example of this being French patent application 93 02191.

The advantages and performance of the present invention are significant and considerable, namely:

- simplicity,
- facility of implementation and change on the cable,
- use of fixed measuring elements (and thus, an absence of mobile linking points with the measuring devices, resulting in reduced fragility and maintenance requirements),
- no influence of hysteresis on the measured values,
- weak influence of signals derived in the X direction on those derived in the Y direction, and conversely, and
- possible modification of the number and angular distribution of the crown according to the reference axes used.

We claim:

1. A stable magnetic field sensor for measuring swing of a cable, comprising:

a crown for attachment to the cable, wherein the crown includes a plurality of permanent magnets disposed radially between an inner magnetic ring and an outer magnetic ring; and a support for attachment to a fixed structure, wherein the support includes a plurality of measuring elements affixed thereto, and wherein the support surrounds the crown and is spaced at a predetermined distance from the crown so that movement of the magnets of the crown within and relative to the measuring elements of the support provides a measurement of the swing of the cable.

2. The stable magnetic field sensor of claim 1 which further includes concentrators affixed to the support and associated with the measuring elements.

3. The stable magnetic field sensor of claim 1 wherein the plurality of measuring elements are Hall effect sensors.

4. The stable magnetic field sensor of claim 1 wherein the plurality of measuring elements are magnetoresistive elements.

5. The stable magnetic field sensor of claim 1 wherein each of the plurality of measuring elements is a single element.

6. The stable magnetic field sensor of claim 1 wherein the plurality of measuring elements are paired, differential elements.

7. The stable magnetic field sensor of claim 1 wherein each of the magnets is in spaced, juxtaposed relation to one of the measuring elements.

8. The stable magnetic field sensor of claim 7 wherein the magnets and the measuring elements are horizontally aligned along perpendicular X and Y axes, and wherein the cable defines a Z axis perpendicular to the X and Y axes.

9. The stable magnetic field sensor of claim 8 having four magnets, wherein two of the four magnets are aligned along the X axis and another two of the four magnets are aligned along the Y axis.

\* \* \* \* \*